US007683754B2

(12) United States Patent
Autret (10) Patent No.: US 7,683,754 B2
(45) Date of Patent: Mar. 23, 2010

(54) METHOD FOR DEFINING A GROUP FROM AMONG BI-DIRECTIONAL OBJECTS

(75) Inventor: Capucine Autret, Marnaz (FR)

(73) Assignee: Somfy, Cluses (FR)

( * ) Notice: Subject to any disclaimer, the term of this patent is extended or adjusted under 35 U.S.C. 154(b) by 604 days.

(21) Appl. No.: 10/503,837

(22) PCT Filed: Feb. 7, 2003

(86) PCT No.: PCT/FR03/00390

§ 371 (c)(1),
(2), (4) Date: Aug. 6, 2004

(87) PCT Pub. No.: WO03/069794

PCT Pub. Date: Aug. 21, 2003

(65) Prior Publication Data

US 2005/0083224 A1  Apr. 21, 2005

(30) Foreign Application Priority Data

Feb. 11, 2002  (FR) .................................. 02 01631

(51) Int. Cl.
*G05B 23/02* (2006.01)
*H04Q 5/22* (2006.01)
*G05B 19/02* (2006.01)

(52) U.S. Cl. .................. 340/3.1; 340/3.7; 340/3.71; 340/10.1; 340/825.22; 340/825.69; 341/176; 455/419; 455/420; 455/41.2

(58) Field of Classification Search .................. 340/3.1, 340/3.7–3.71, 10.1, 825.22, 825.25, 825.72, 340/825.69; 341/176; 348/107; 455/419, 455/420, 41.2; 370/461, 312

See application file for complete search history.

(56) References Cited

U.S. PATENT DOCUMENTS

| 4,529,980 | A |   | 7/1985  | Liontine et al.             |
|-----------|---|---|---------|------------------------------|
| 4,750,118 | A |   | 6/1988  | Heitschel et al.            |
| 5,148,159 | A |   | 9/1992  | Clark et al.                |
| 5,726,645 | A | * | 3/1998  | Kamon et al. ......... 340/825.22 |
| 5,797,085 | A |   | 8/1998  | Beuk et al.                 |
| 6,028,866 | A | * | 2/2000  | Engel et al. ................. 370/461 |
| 6,049,289 | A |   | 4/2000  | Waggamon et al.             |
| 6,160,491 | A | * | 12/2000 | Kitao et al. ............ 340/825.69 |
| 6,297,746 | B1 | * | 10/2001 | Nakazawa et al. ..... 340/825.69 |
| 6,556,221 | B1 | * | 4/2003  | Shima et al. ................ 715/764 |

(Continued)

FOREIGN PATENT DOCUMENTS

EP  0 651 119 B1  5/1995

(Continued)

OTHER PUBLICATIONS

International Search Report PCT/FR03/00390.

*Primary Examiner*—Brian A Zimmerman
*Assistant Examiner*—Nam V Nguyen
(74) *Attorney, Agent, or Firm*—Husch Blackwell Sanders Welsh & Katz (57) ABSTRACT

A method for defining a group from among a plurality of bidirectional objects, comprising the following stages: a) synchronous application to the objects in a group of an initiator event, b) sending of a message containing a group identifier, and c) recording by the objects that have been subjected to the initiator event of the group identifier.

11 Claims, 3 Drawing Sheets

U.S. PATENT DOCUMENTS

| | | | |
|---|---|---|---|
| 6,567,032 B1 * | 5/2003 | Mullaly et al. | 341/176 |
| 6,717,528 B1 * | 4/2004 | Burleson et al. | 340/825.72 |
| 6,781,518 B1 * | 8/2004 | Hayes et al. | 340/825.72 |
| 6,791,467 B1 * | 9/2004 | Ben-Ze'ev | 340/825.69 |
| 6,970,067 B1 * | 11/2005 | Sinke et al. | 340/5.65 |
| 7,058,386 B2 * | 6/2006 | McGregor et al. | 455/405 |
| 2002/0129095 A1 * | 9/2002 | Hatalkar | 709/203 |
| 2007/0075834 A1 * | 4/2007 | Armstrong et al. | 340/10.1 |

FOREIGN PATENT DOCUMENTS

| | | |
|---|---|---|
| FR | 2 808 834 | 11/2001 |
| FR | 2 827 414 | 1/2003 |
| WO | WO 01/71685 A1 | 9/2001 |
| WO | WO 03/007265 A1 | 1/2003 |

* cited by examiner

FIG_1

FIG_2

FIG_5

METHOD FOR DEFINING A GROUP FROM AMONG BI-DIRECTIONAL OBJECTS

FIELD OF INVENTION

The invention relates to the field of transmitters of commands and receivers of commands having transmit and receive capabilities; it in particular relates to transmitters and receivers in home automation systems.

BACKGROUND

Such home automation systems are used for motorized products or automatic devices for closing or solar protection in the building, or for the control of lamps or other systems. Typically, one or more command transmitters are provided; each device to be controlled—rolling shutter, blind, lighting unit, etc.—is associated with a command receiver; it is also possible for provision to be made for several devices to be controlled by a same command receiver. The command transmitters and command receivers communicate by radio and use the same transmission frequency, or predetermined frequencies. For these devices, and in particular for motorized products or automatic devices for closing or solar protection in buildings, logistic reasons most often necessitate that the pairing is not performed during manufacture, but rather on the worksite, after installation of the products. Various pairing solutions are proposed in the state of the art.

Certain solutions relate the case where command transmitters are capable only of transmitting and where command receivers are capable only of receiving. U.S. Pat. No. 4,750, 118 or U.S. Pat. No. 6,049,289 are examples of such solutions. Other solutions use command transmitters and command emitters capable of transmitting and receiving; U.S. Pat. No. 4,529,980, or U.S. Pat. No. 5,148,159 are cited in particular.

French patent application FR-A-2 827 414, published after the priority date of this application, describes a method of pairing transmitter and receiver. In this application, it is proposed to fit the receiver with a hardware or software device to set it to pairing, or learning, mode. When said device is active, the receiver moves into pairing mode. When it ceases to be active, the receiver reverts to operational mode. The device can be sensitive to a momentary cut in the receiver power supply.

Moreover, a method of re-initialising a rolling shutter operator using an additional wire, which may be connected to the mains, is known. Such a solution is described in FR-A-2 808 834.

U.S. Pat. No. 6,028,866 describes a communication system in which each device includes a communication identification, which is allocated in the factory or by the user. For a group constitution, a central device sends a message inviting devices to join the group. On receipt of an invitation message, a device responds as appropriate with an acceptance message. The central device stores a list of the devices forming the group, i.e. the devices that have responded with an acceptance message. Said procedure for forming a group allows messages intended for the group to be sent.

EP-A-0 651 119 describes a set of transmitters and receivers, and mentions the pairing problem. Pairing is effected by learning a code for one transmitter from another transmitter. The two transmitters are placed side by side and the button for the channel in question is pressed on each transmitter, starting with the "teaching" transmitter. This gradual method of learning the codes is also applied to the receiver. The document envisages inhibiting the code teaching function on some transmitters. This document does not propose to form groups from among receivers.

WO-A-01 71685 discloses a universal remote controller, suited to controlling various units. Each unit contains a record of the various data necessary to allow the controller to manage it remotely, with a device code in particular; the record is copied into the universal controller. This document proposes that the controller interrogates the various units that it controls successively. It is proposed to group in a network the different units controlled by a remote controller; WO-A-01 71685 does not give details of how to form such a network.

U.S. Pat. No. 5,797,085 describes a communication system in which the different objects are not paired. On the contrary, the objects are identical from the communication point of view and do not have an unique address.

There is always a requirement for a method of defining a group from among a plurality of operators simply and reliably. Such a process must maintain its reliability even in a dense radio environment or heavily loaded network—for example in the presence of previously configured neighbouring products, or neighbouring products undergoing configuration.

SUMMARY

In one embodiment, the invention therefore proposes a method of defining a group from among a plurality of bidirectional objects, comprising the following stages:
 (a) synchronous application to the objects in the group of an initiator event;
 (b) sending a message containing a group identifier, and
 (c) recording by the objects that have been subjected to the initiator event of the group identifier.

In one embodiment, the synchronous action comprises an action on a power supply common to the objects in the group. It may also or alternatively comprise the transmission to the objects of a command. The initiator event should include an action on a power supply for the unpaired objects.

The sending stage is performed by an object that has been subjected to the initiator event. In this case, the object that has been subjected to the initiator event sends a message containing the group identifier if it does not receive such a message in a time interval following the initiator event.

In another embodiment, an object that has been subjected to an initiator event records the group identifier only if the message is received within a predetermined time interval following the initiator event. The message containing a group identifier can also contain a time reference counted with reference to the initiator event. Said time reference should include a time indication between the initiator event and the sending of the message containing the group identifier. Alternatively, each object is provided with an internal clock and the time reference comprises an indication of the date or time of the initiator event.

The invention also proposes a programme for operating a bidirectional object comprising:
 (a) a routine for receiving an initiator event;
 (b) a routine for receiving a message and extracting a group identifier contained in the message, and
 (c) a routine for recording the group identifier.

In one embodiment, the routine for receiving an initiator event is capable of detecting variations in the power supply to the object. It may also be capable of receiving an initiator message.

The programme may also comprise a routine for sending a message containing a group identifier. In this case, the sending routine should be inhibited when the message reception routine starts.

There may even be a routine for calculating the time, starting from the execution of the routine for receiving an initiator event; the recording routine is thus only started within a predetermined time interval. There may also be a routine for calculating the time, starting from the execution of the routine for receiving an initiator event; in this case, the routine for receiving a message is capable of extracting a time reference from the message.

Finally, the invention proposes a bidirectional object with:
- a reception stage;
- a transmission stage;
- a logic unit controlling the transmission and reception stages and
- a memory containing such a programme.

BRIEF DESCRIPTION OF THE DRAWINGS

Other characteristics and advantages of the invention will become apparent on reading the description which follows, given by way of example and by referring to the drawings which show FIG. 1, a schematic view of an installation according to the invention.

DETAILED DESCRIPTION

In the description which follows, the invention is described in an example of its application to the pairing of home automation systems; it is not limited to such systems; it can also be used for purposes other than pairing. Hereinafter, the terms "command transmitter" and "command receiver" are used to describe objects whose function is to transmit or receive commands given by a user; said descriptions are not representative of "transmitter" or "receiver" functionalities which, from the point of view of the signals, are capable both of sending and receiving. The term "bidirectional object" thus could have been used, i.e. an object having both transmit and receive capabilities. For clarity in the explanation, the terms "transmitters" and "receivers" are used—which only represent the allocation of a given bidirectional object to a particular use.

It is also assumed in the following description that each bidirectional object is given an univalent identifier; this may be an identifier corresponding to an object code set in the factory and which cannot be changed; it may also be a number which can be changed, such as a random number chosen in the object or even a number chosen using micro-switches. The origin of the identifier has no effect on the functioning of the method. It will also be noted that the identifier used hereinafter may be changed after the group definition or after the pairing; it is simply used to identify the object during pairing.

Figure 1:
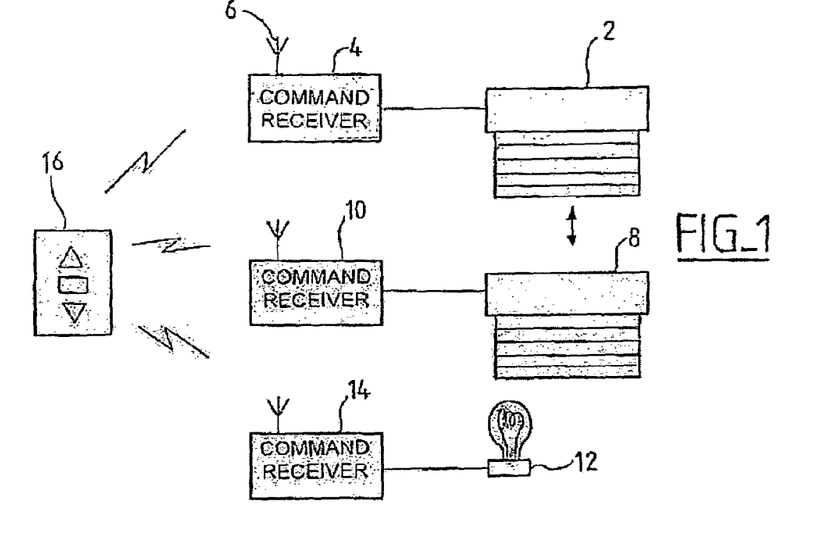

FIG. 1 shows a schematic view of an installation in an initial example of the implementation of the invention. The installation includes an operator 2. Said operator can, for example, roll blinds up or down, open or close rolling shutters or a garage door, switch a light on or off, open a door, trigger or clear an alarm, etc. The operator is connected to a receiver. The command receiver has an antenna 6 which allows it to receive commands transmitted via a radio link from a command transmitter; the command receiver 4 can also transmit signals, for example via the radio link, using the same antenna 6. The transmission by radio of commands from a transmitter to a receiver or vice versa is known per se and is not described here in more detail.

FIG. 1 also shows a plurality of operators 8, 12, each with their command receiver 10, 14. It also shows a command transmitter 16; this is suited to transmitting by radio link one or more commands addressed to the receivers 4, 8, and 12 and has an antenna for this purpose (not shown). Typically, a command transmitter, in the case of controlling a rolling shutter, can transmit commands to raise or lower the shutter, or to stop the shutter; other commands can also be given, such as placing the shutter in pre-programmed positions, commands for programming the shutter, etc. The command transmitter thus has one or more devices allowing the user to enter a command, in the simplest case one or more control buttons. The command transmitter is also capable of receiving signals from the command receiver(s); as with the command receiver, the same antenna is used.

Thus, according to the command received from the user, its operating programme and/or signals received from the command receivers, the command transmitter sends signals, as explained below.

A number of transmit or receive channels can be provided for the command transmitter and the command receiver; in a simple configuration, radio is used, and thus the transmitter as a sender is a "transceiver", i.e. a transmitter and a receiver.

A requirement which is posed in this connection is to define a group from among the different objects. This group is then used to select an object to be paired, as described in the application filed on the same day by the applicant under the title "Method for pairing bidirectional objects". Said pairing method uses a temporary allocation of the command receivers in a group to a command transmitter. The temporary allocation is used to pair a command receiver that has been subjected to an initiator event, even in a dense radio environment, in which numerous messages are transmitted.

Figure 2:
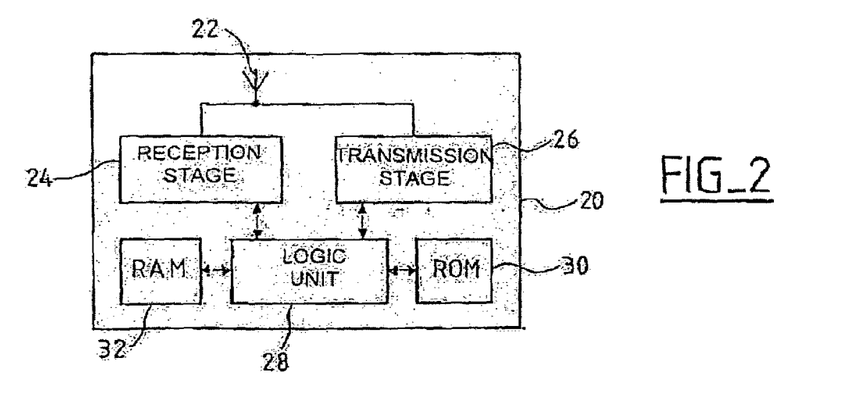
FIG. 2, a schematic view of the logic structure of a bidirectional object allowing implementation of the invention.

FIG. 2 is a schematic view of the logic structure for a bidirectional object used as a command transmitter or as a command receiver. In the example shown, the object is a "transceiver" and sends and receives signals by radio link, using a single antenna. The object 20 therefore has an antenna 22, a receive stage 24, linked to the antenna; the receive stage receives signals picked up by the antenna 22. It also has a transmit stage 26, it is also linked to the antenna 22, which transmits signals to be transmitted to the antenna. The transmit and receive stages are controlled by a logic unit 28, such as a microprocessor, which is capable of executing a programme stored in a memory 30, typically a read-only memory. The object also has a read-write memory 32 whose content can be changed while the object is functioning.

According to its allocation as a command transmitter or as a command emitter, the power source feeding the object can vary; typically a command transmitter is a portable device, fed by a cell or battery; a command receiver is connected to the operator and is thus fed from the mains.

A command transmitter and a command emitter may also differ in the operating programme stored in the memory 30—insofar as it is advantageous to limit the size of the memory 30, to differentiate the objects by loading into memory an operating programme which is designed only for the sole functionalities of a command transmitter (or command receiver).

The identifier of the object is stored in the read-only memory 30, or can even be stored in the memory 32, if it is generated at random or otherwise.

The means which allow an object to respond to a user command are not shown; these may be buttons, contacts, switches or other, both for command transmitters and command receivers. It can also be envisaged that the object is sensitive to one or more power cuts; this is particularly advantageous for a command receiver, as shown below. Such sensitivity is implemented by detecting variations to the power supply —a power cut, switching on, voltage variations, etc.

Figure 3:
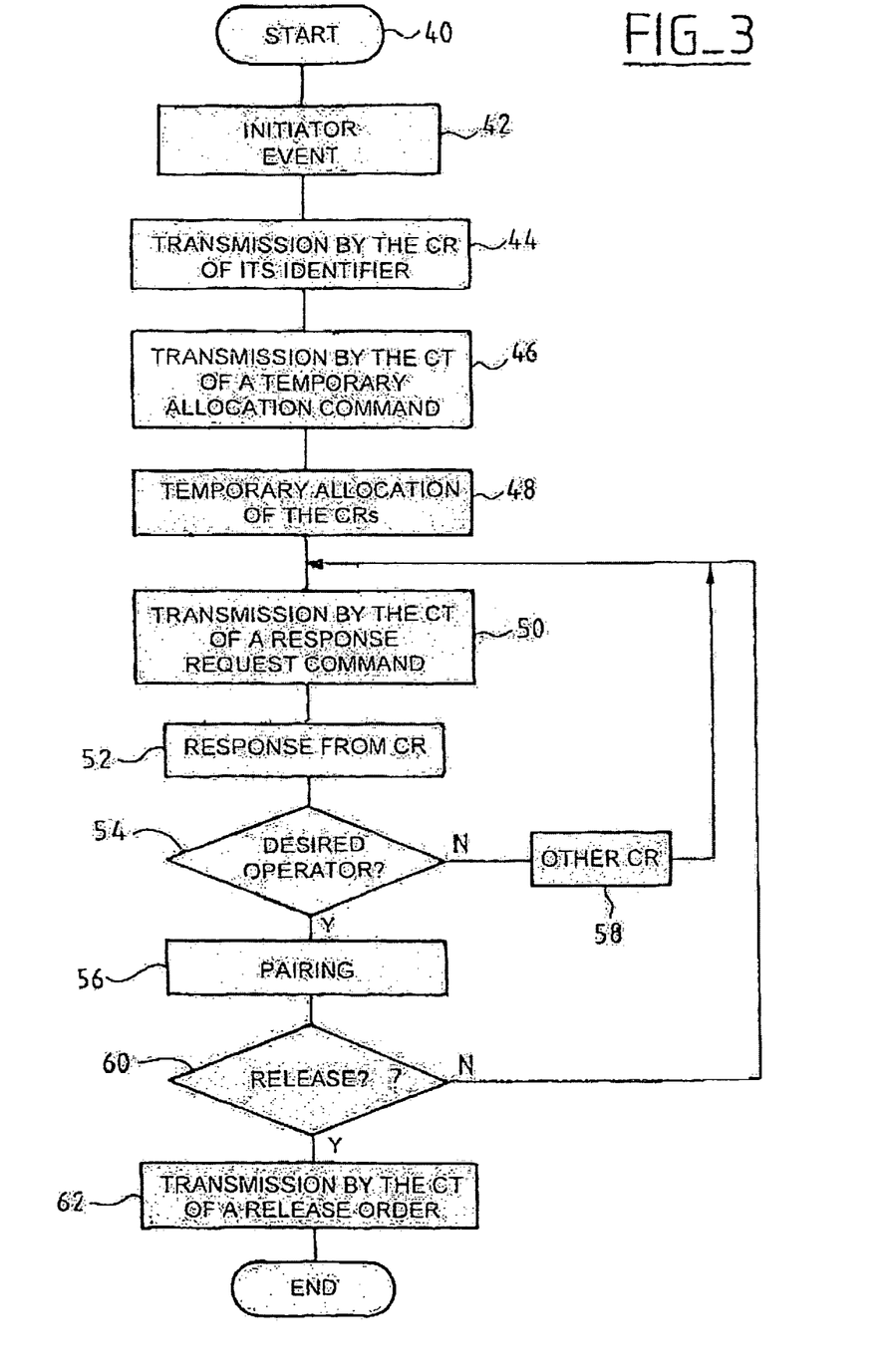
FIG. 3, a flow chart of a method of pairing using a group definition according to the invention.

FIG. 3 is a flow chart for a method of pairing, as described in the application "Method for pairing bidirectional objects". More particularly, this method of pairing details the stages of forming the group according to the present invention.

The start point (stage 40) is assumed to be the existence of a number of bidirectional objects intended to function as "command receivers" and a bidirectional object used as the command transmitter.

At stage 42, an initiator event is produced by the user; this is, in the example, by an external command—i.e. it is not sent by a command transmitter. For example, it may be a specific action on the command receiver power supply, typically a double break to the mains power. This solution has the merit of being simple to implement, insofar as command receivers are generally connected to the mains, as explained earlier. It is also conceivable that the initiator event results in a command receiver actioning a local command, or a local change to the branch power supplies; said solution in particular allows a command receiver to be re-paired, even if it had been paired beforehand. In every case, the initiator event is detected by the command receivers.

Receipt of a command sent by a command transmitter could also be used as an initiator event; said solution could be used to pair a command receiver from among those that could receive the command in question. This solution has the advantage of simplicity, but the drawback that command receivers cannot be selected—unless it is assumed that they are already paired to a given command transmitter. The combination of an external command and a command sent by a command transmitter could also be used as the initiator event; the external command—for example a local action on the receiver—is used to select the command receivers that must respond; the command send by the command transmitter is used for synchronism, which can be useful, as described later.

It is yet more advantageous to use a different initiator event, according to the status of the receiver—paired or not. For a receiver which is unpaired, the initiator event should not be a simple message. This is used to select the different receivers by an action on the power supply or by an action on the receiver. A simple message can be used as the initiator event for a receiver which is already paired; in fact, as the receiver is already paired, its identity is already known and a message addressed to all the receivers in a group, or to some of them, can be used as the initiator event. Hence an initiator event could be

- an initial message addressed to a particular identified receiver, or to several identified receivers in a group, requesting the receivers to wait for an initiator event;
- a second message, which would not necessarily appear to the addressee, which would constitute a synchronous event for all the receivers.

This solution selects the receivers to which the initiator event is applied synchronously.

By way of example, assume an installation with a general command—i.e. a command transmitter paired to all the command receivers. To form a sub-group from among the command receivers—for example in order to control all the receivers of the same unit or of the same type—an initial message is sent successively to all the receivers in question, and a second message is then sent to all receivers in the group. Only the receivers having received the first message react to the synchronous event which constituted the second message. On receipt of the group identifier, said receivers in question can thus record the group identifier.

At stage 44, in response to the initiator event, a command receiver that must be paired sends a signal representing its identifier and an indication which is available for pairing. As has just been mentioned, these may be command receivers which have never been paired previously; they may also be command receivers which have been paired previously and which need to be re-paired. The signal sent in this case is the most simple, formed from the identifier of the command receiver and a specific code signalling that it is available for pairing; an alternative is to send only the receiver identifier, in a specific format.

This transmission can be repeated at regular intervals for a predetermined period—for example 2 to 3 minutes. If a number of command receivers are sending which is the most likely assumption—the conventional rules for detecting collision and repetition can be used during the transmission. The predetermined time is selected according to the rules of detection, collision or repetition, and the maximum acceptable number of command receivers transmitting during this stage.

On completion of this stage, the command receiver(s) that has/have received the initiator event have sent their identifier(s); in this way, an "auditor" of the signals sent recognises which command receivers have responded to the initiator event; a command transmitter active during stage 44 can thus build up a list of the command receivers that have transmitted during this stage. Likewise, any bidirectional object can compile a list of command receivers that have sent their identifier to form the group. A command receiver that has been subjected to the initiator event can thus record the identifiers of the other command receivers, and thus be conversant with the group formed by the different command receivers that have been subjected to the initiator event.

The remainder of the method in FIG. 3 shows the use of the group for pairing, insofar as this is simply an example of how the group is used and is only described summarily.

At stage 46, a command transmitter is switched on and sends a signal representative of its identifier and a temporary allocation command.

At stage 48, the command receivers that have transmitted their identifiers at stage 44 record the identifier of the command transmitter in a memory. For a predetermined period, said command receivers will refuse to obey any command which does not originate from this command transmitter. These receivers are therefore allocated temporarily to the command transmitter which sent the temporary allocation command at stage 46.

The predetermined time for the temporary allocation is used for the pairing of a command transmitter and a command receiver; it can be fixed—and, in this case, the command receivers revert to normal operation on expiry of this period. As explained later, the temporary allocation may only cease on transmission by the command transmitter of a release command or of a command ending the temporary allocation.

On completion of this stage 48, the command receiver(s) that were identified at stage 44 and which received a temporary allocation command at stage 46 will now only obey commands received from the command transmitter; the command transmitter which sent the temporary allocation command itself has a list of command receivers. It thus becomes possible to proceed with the pairing, or any other manipulation involving the transmitter and the receivers, independently of the radio environment.

At stage 50, the command transmitter sends a signal representative of its identifier and a response request command addressed to a receiver in the list—for example the first on the list. The purpose of the response request is to allow the user to determine visually, audibly, or by any other method, the receiver addressed.

At stage 52, on receipt of the response request command, the receiver concerned responds with a signal. This signal may be the abbreviated command from the operator controlled by the receiver concerned; such a signal allows the user to identify the receiver.

At stage 54, the user determines whether the signal sent at stage 52 has originated from the desired receiver or not. If this is the case, the next stage is 56, and if not, stage 58.

At stage 58, another receiver on the list is polled—for example, the next receiver. This corresponds to sequential scanning of the list; the list can also be scanned at random. The next move is to return to stage 50, to issue a fresh response request addressed to this other receiver. The same command from the command transmitter is used to move to another receiver.

At stage 56, the receiver to be paired has responded to the response request command. It is therefore possible to proceed with the actual pairing; this is done using the command transmitter allocated temporarily, by sending to the command receiver which has just responded a signal representative of the identifier of the transmitter to be paired—which is the command transmitter allocated temporarily, or another.

The command receiver which receives the pairing message stores in a memory the identifier of the command transmitter received in the pairing message, in order that it can then respond to commands which it receives from it. It moves into a paired state, in which it no longer responds to an initiator event such as a double power cut, but only to a particular initiator event—a local action or even a re-pairing command from the command transmitter to which it is paired.

On completion of the pairing stage 56, a command transmitter is paired to the command receiver which last responded to the response request command. At stages 60 and 62, the other receivers allocated temporarily are released if appropriate. As explained earlier, these stages are not essential; the receivers can be programmed such that the temporary allocation ceases after a set period; the temporary allocation can also be ceased on receipt of a pairing command, even if addressed to another command receiver.

However, it is advantageous to give the user the option to continue pairing receivers from the list other than the one that has just been paired. This avoids the requirement to re-send the initiator event to pair the other receivers. At this stage 60, the user is prompted as to whether he wishes to release the other receivers. If this is the case, he moves to stage 62, where the release command is sent; if not, he returns to stage 50, in order to send a new response request command; stages 60 and 62 can be implicit; thus, if the command transmitter is used as a programming console, the stage 62 test consists simply of confirming whether the user has pressed the button again to send a response request command—which results in a move directly to stage 50. In the absence of such a response request command, a move to stage 62 would be the result, unless release was implicit on the elapsing of a set period. Conversely, it is equally conceivable that a new initiator event could be sent at stage 62, in the form a specific command addressed to receivers on the list as yet unmatched.

The method described in FIG. 3 allows certain pairing, regardless of the radio environment. In the example of FIG. 3, the group is in fact used only by the command transmitter which does the pairing: de facto, in this application, it is not effective to store the group in the different command receivers.

Figure 4:
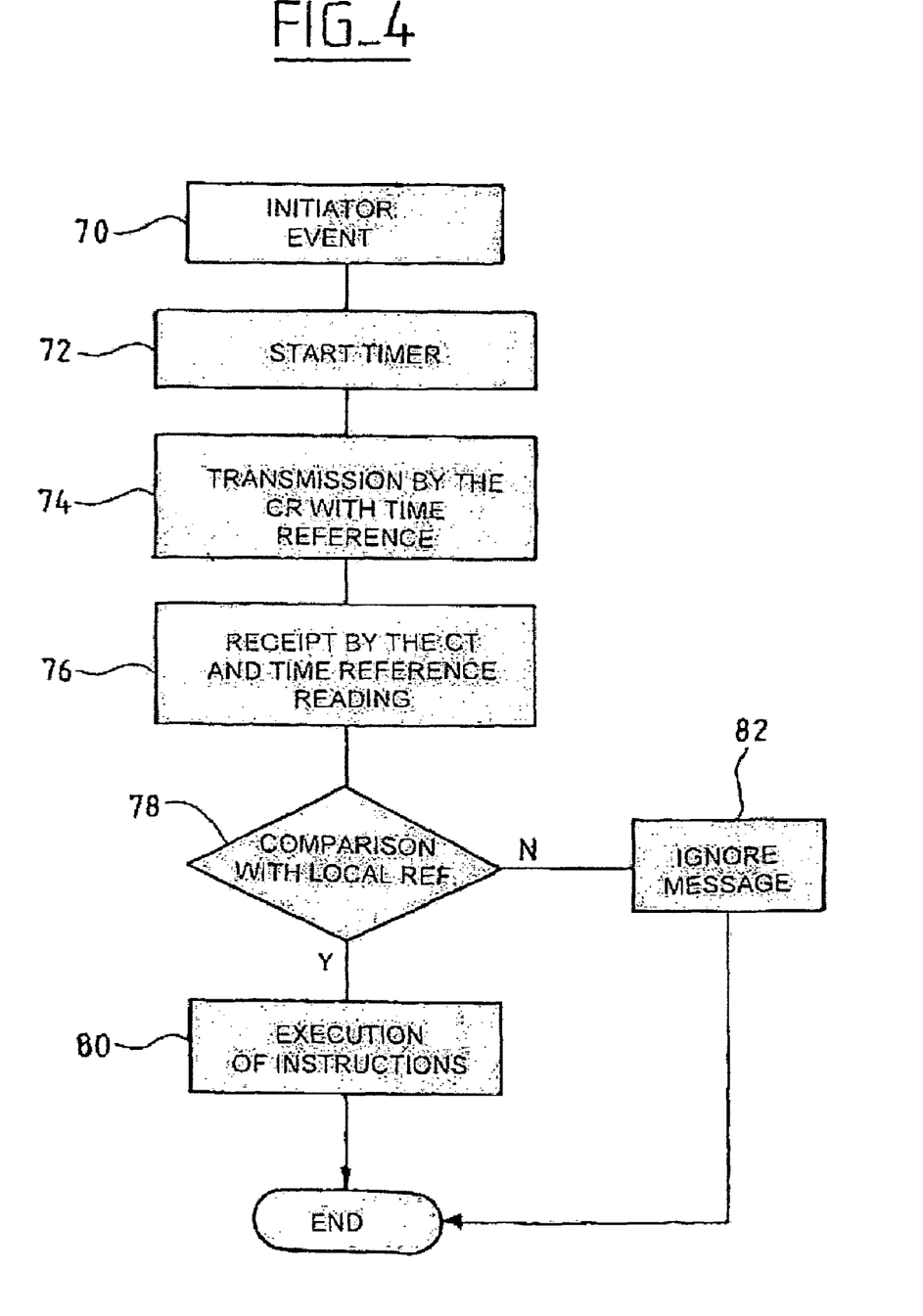
FIG. 4, a flow chart of a method to secure the definition of a group among the bidirectional objects.

FIG. 4 shows another example of group formation, according to another embodiment of the invention. The method of FIG. 4 secures the group formation even more and avoids, in a complex installation, or neighbouring a complex installation, any overlapping of objects that could be paired although they are not in a single group. This method defines the group with greater security.

The method of FIG. 4 is based on the synchronous character of the initiator event; it proposes to use said event as a time reference; said reference allows a command receiver that has received the initiator event to be identified from its local time, measured against this time reference. It therefore suffices for a command or response sent by a command receiver to be accompanied by an indication of the local time, as will now be described.

The synchronous initiator event is produced at stage 70; as explained earlier, this can be an external command—in the example, a given action on the mains. It may also be a combination of an external command and a command received from a command transmitter, as explained above or a command received from a command transmitter.

At stage 72, each command receiver that has detected the initiator event starts a timer.

At stage 74, a command receiver sends a signal; this may be the signal from stage 44 of FIG. 3, or any other signal sent subsequently by the command receiver; said signal includes an indication from the timer, as well as the identifier of the command receiver. Hence the signal sent by the command receiver is dated with reference to the time reference that constitutes the initiator event.

At stage 76, the signal sent at stage 74 is received by the object to which it is addressed—for example the command transmitter. Therefore this also has the timer indication. At stage 78, this time indication is compared with an indication calculated locally in the command transmitter; this indication results from a comparison with the time indications received from other command receivers. It may also come from a command transmitter timer—particularly if this originated the initiator event.

If the time indication of the received signal is consistent, the next move is to stage 80, in which the instructions or commands sent by the command transmitter are processed; conversely, if the time indication is inconsistent with the indication calculated locally, the next stage is 82. At stage 82, it is known that the signal sent at stage 76 is inconsistent and that the signal received at stage 76 did not come from a command receiver that had been subjected to the initiator event. The message or the instructions received are ignored.

The method of FIG. 4 thus allows the origin of a message to be identified with more certainty; it is used to secure the constitution of groups using an initiator event.

There are possible variants of the method described in FIG. 4. Thus, if the command transmitter cannot itself detect the initiator event—for example, because the command transmitter is a roving object, not connected to the mains—it can nonetheless trigger its own timer at the instant of its first activation. The counter settings collected in each frame are thus decremented by the setting of the command transmitter counter before being recorded with all the command receiver identifiers during the capture. At the end of the capture phase, these settings are all compared and these will differ to some degree from the mean setting corresponding to the identifiers which are not included.

The way in which the time reference is coded can also be changed. Thus, if the various objects are fitted with an internal timer—for example, to allow time programming by the user—they cannot start a counter, but simply note the date and time of the initiator event. Said date and/or time can then be sent in a message.

The stage 78 consistency test depends on the desired accuracy and computer drift. For timers as currently used on rolling shutters, with a drift of some 300 ms/hour, it is considered that objects which have received a single initiator event must respond with a time indication of approximately 10 ms. This allows differentiation between initiator events separated by less than 100 ms, and in practice makes any confusion between two groups of objects extremely improbable.

In the example of FIG. 4, the insertion of a time indication into messages sent by command receivers to a command transmitter is described. The method of FIG. 4 is therefore applied to the example from FIG. 3. However, it is understood that the definition of a group among the of command receivers, explained with reference to FIG. 4, can be implemented for purposes other than the pairing described with reference to FIG. 3. In the case of home automation operators, the method of FIG. 4 is implemented for the definition of a general command for centralised programming of all the receivers or some of them. More generally, the method of FIG. 4 is used for any sequence on the objects of a group—the group being defined by the initiator event.

Compared with the solution described at FIG. 3, the solution of FIG. 4 ensures greater security, even if the distinct programming sequences are implemented on the objects—which may in particular be the case if the operators are programmed simultaneously in neighbouring apartments.

In the example of FIG. 4, the different objects send all the messages; this is relevant insofar as the different objects act as command receivers, and send their identifier to the command transmitter for pairing; to form a group, this solution is not mandated; it suffices that a single object provides to the others a time indication in order that the other objects can determine whether or not they belong to the same group as that which has provided the indication. Thus the list of objects from a group could be generated by sending a command with a time indication from an object; the other objects having the same time indication could thus be declared. This solution limits the exchanges to the extent that only the group members are declared.

The FIG. 4 solution is implemented simply by programming the command receivers to send a time reference in one or all messages.

Figure 5:
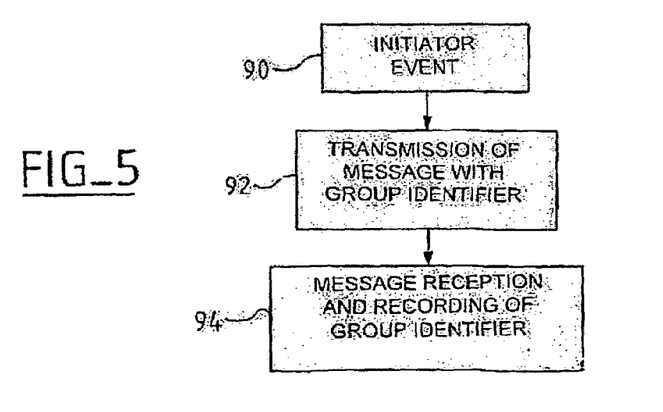
FIG. 5, a flow chart for another method of defining a group according to the invention.

FIG. 5 also shows a further embodiment of the invention. Stage 90 corresponds to the initiator event; the comments made earlier still apply.

At stage 92, a message containing a group identifier is sent. The message can be sent by one of the members of the group or by other means. If the message is sent by a member of the group, the initiator event can trigger the sending of the message and collision detection mechanisms are used to ensure that at least one message is sent without colliding. The message can also be sent by a member of the group on action by a user—local excitation of the member of the group in question, or even receipt of a command by the member of the group in question. The message can also be sent by an object which is not a member of the group.

The stage 92 message contains a group identifier. This can be a time reference, but is more generally any other group identifier. For example, a random number generated by the object which sends the stage 92 message could be used as the group identifier. The identifier of the object which sends the stage 92 message could also be used as the group identifier.

At stage 92, the objects which have
been subjected to the initiator event and
received the stage 92 message record the group identifier received during stage 92. They are thus considered as part of the group defined by the recorded group identifier.

The group thus defined is used for pairing purposes, as explained above. It can also be used for other purposes, for example for the definition of a general command. Such a general command can be defined very simply and no longer, as in the state of the art, by pairing a command transmitter successively to each of the command receivers.

The stage 94 recording can take place only if the stage 92 message is received during a predetermined time slot following the initiator event. This limits the risks of disturbance in the formation of the group. For example:
a message could be sent by all objects that have been subjected to the initiator event; and
all the objects that have been subjected to the initiator event could record the first group identifier received.

Such a sequence allows the group to be formed in a few tens of milliseconds, which limits any risk of interference with other installations.

To limit the risks of collision, an object can select at random the time at which the message with the group identifier is sent. For example, assume a group of 20 objects, with 20 defined time slots for message transmission, each time slot being 10 ms. An object being subjected to the initiator event selects at random a time slot and sends a message with the group identifier in said time slot, unless it has not received correctly in a preceding time slot a group identifier message.

The embodiment by programming of the various proposed stages is not given in detail, as this is within the scope of a person skilled in the art using programming techniques that are well known as such.

Of course, the invention is not limited to the embodiments given above. The radio transmission used between a transmitter and a receiver is given only by way of example and can be modified. The invention applies in particular when the transmitters and receivers use a single frequency or each transmit on a separate frequency, or by frequency hopping, or with different modulations. In fact, the method applies immediately command transmitters or command receivers are "bidirectional objects" capable of sending and receiving.

The terms "command receivers" and "operators" have been used, which apply in particular to the example of rolling shutter operators. The receiver and the operator can be separate items, as in the examples, or form a single assembly—for example, by integrating the command receiver in the operator.

Clearly, the messages or identifiers can be coded or encrypted, by using techniques that are well known in the state of the art.

Finally, the various stages of the different embodiments can be combined; thus, what is termed the time reference in FIG. 4 is applied to the group identifier of FIG. 5.

Specific embodiments of a method for defining a group from among bidirectional objects according to the present invention have been described for the purpose of illustrating the manner in which the invention may be made and used. It should be understood that implementation of other variations and modifications of the invention and its various aspects will be apparent to those skilled in the art, and that the invention is not limited by the specific embodiments described. It is therefore contemplated to cover by the present invention any and all modifications, variations, or equivalents that fall within the true spirit and scope of the basic underlying principles disclosed and claimed herein.

The invention claimed is:

1. A method for forming a group from among a plurality of bidirectional objects acting as command receivers or command transmitters, in a home automation system, comprising at least successively:

applying a synchronous initiator event to command receivers selected to form the group, the initiator event including at least a synchronous action upon a power supply common to the command receivers selected to form the group;

sending a message by each of the command receivers subjected to the initiator event, each message including an identifier of the command receiver and a time indication resulting from the initiator event;

receiving the messages in a command transmitter and, for each message, comparing the received time indication with a calculated time indication; and as a result of the comparison between the received time indication with the calculated time indication, recognizing in the command transmitter whether or not a particular command receiver had been subjected to the initiator event.

2. The method of claim 1, wherein the synchronous action upon the power supply includes switching off and on the mains power supplying the receivers selected to form the group.

3. The method of claim 1, wherein the command receivers include a timer that is triggered by the initiator event.

4. The method of claim 3, wherein the time indication is the content of the timer when the message is sent.

5. The method of claim 1, wherein the command receivers are provided with a clock that is sampled to note the date and time of the initiator event.

6. The method of claim 5, wherein the time indication is the date and/or hour of the initiator event.

7. The method of claim 1, wherein the calculated time indication results from a comparison with the time indications received from other command receivers.

8. The method of claim 1, wherein the initiator event is a combination of an external command not sent by the transmitter, the action upon the power supply, and a command sent by the command transmitter.

9. The method of claim 1, the method further comprising sending by the command transmitter a signal representative of its identifier and a temporary allocation command, such that command receivers belonging to the group which receives the temporary allocation command will only obey commands received from the command transmitter.

10. The method of claim 1, wherein the initiator event is different according to a paired or not-paired status of the command receivers.

11. A method of centralized programming of all receivers or some receivers in a home automation system using the method for forming a group of claim 1.

* * * * *